United States Patent
Väisänen et al.

(10) Patent No.: US 10,462,618 B2
(45) Date of Patent: Oct. 29, 2019

(54) HANDLING A PRE-EMPTED COMMUNICATION

(71) Applicant: AIRBUS DEFENCE AND SPACE OY, Helsinki (FI)

(72) Inventors: Mika Väisänen, Espoo (FI); Olli-Pekka Lahtinen, Espoo (FI); Roman Pichna, Espoo (FI)

(73) Assignee: AIRBUS DEFENCE AND SPACE OY, Helsinki (FI)

( * ) Notice: Subject to any disclaimer, the term of this patent is extended or adjusted under 35 U.S.C. 154(b) by 103 days.

(21) Appl. No.: 14/898,533

(22) PCT Filed: Jun. 23, 2014

(86) PCT No.: PCT/EP2014/063138
§ 371 (c)(1),
(2) Date: Dec. 15, 2015

(87) PCT Pub. No.: WO2014/206925
PCT Pub. Date: Dec. 31, 2014

(65) Prior Publication Data
US 2016/0135024 A1    May 12, 2016

(30) Foreign Application Priority Data
Jun. 24, 2013   (EP) .................................... 13173369

(51) Int. Cl.
*H04W 4/16* (2009.01)
*H04W 76/38* (2018.01)

(52) U.S. Cl.
CPC ............. *H04W 4/16* (2013.01); *H04W 76/38* (2018.02); *H04M 2250/66* (2013.01)

(58) Field of Classification Search
CPC ....... H04W 4/16; H04W 76/068; H04W 4/12; H04M 2250/66; H04L 51/04; H04L 51/26; H04L 65/4007
(Continued)

(56) References Cited

U.S. PATENT DOCUMENTS

| 2002/0176546 A1 | 11/2002 | Dietz et al. |
| 2008/0165791 A1 | 7/2008 | Degrazia |

(Continued)

FOREIGN PATENT DOCUMENTS

| CN | 101690091 A | 3/2010 |
| CN | 101730271 A | 6/2010 |

OTHER PUBLICATIONS

International Search Report dated Aug. 28, 2014 corresponding to International Patent Application No. PCT/EP2014/063138.
(Continued)

*Primary Examiner* — Marcus Hammonds
(74) *Attorney, Agent, or Firm* — Squire Patton Boggs (US) LLP

(57) ABSTRACT

To provide a possibility to have a near-real-time replay of a pre-empted communication while ensuring that the pre-empting communication is not interrupted, when it is detected that a pre-empting communication is pre-empting a pre-empted communication, the pre-empted communication is buffered to a buffer for a replay, and a safety interval for the pre-empting communication is determined. The pre-empting communication is determined to be ended in response to an expiry of the safety interval after end of the pre-empting communication.

20 Claims, 6 Drawing Sheets

(58) Field of Classification Search
USPC .................................................... 455/414.1
See application file for complete search history.

(56) References Cited

U.S. PATENT DOCUMENTS

2009/0003558 A1* 1/2009 Katis .................. H04L 12/1831
  379/93.01
2009/0220064 A1* 9/2009 Gorti ....................... H04M 3/56
  379/202.01

OTHER PUBLICATIONS

Written Opinion of the International Searching Authority dated Aug. 28, 2014 corresponding to International Patent Application No. PCT/EP2014/063138.
European Search Report dated Feb. 5, 2014 corresponding to European Patent Application No. 13173369.3.
Chinese Office Action and the English Language Translation dated May 3, 2018, issued in corresponding CN Application No. 201480036149.3.
Mar. 14, 2019 Office Action issued in Chinese Patent Application No. 201480036149.3.

* cited by examiner

HANDLING A PRE-EMPTED COMMUNICATION

FIELD

The present invention relates to concurrent communications to a user of an apparatus, and especially to handling a pre-empted communication.

BACKGROUND ART

A Professional Mobile Radio (PMR) network is a mobile communication network for a special group of users, for example, for one or more enterprises or institutions. Typical examples of PMR networks are public safety type PMR networks used by public officials such as police, fire brigade and medical personnel. Consequently PMR networks are often used in field in emergency scenarios that may influence people's health or even life. To ensure that a critical communication, like an emergency communication, will be transmitted, prioritization and pre-emption procedures are provided in the PRM networks. The pre-emption means that a connection is released because of a higher priority connection. Priorization and pre-emption may cause that a user participating to a group call, group call A, may be automatically changed to another group call, group call B, if the group call B has a higher priority. Since groups have different participants, it may be that the group call A continues although the user is not any more participating to it. Hence, the user misses some information exchanged in the lower priority group call.

SUMMARY

An object of the invention is to provide a possibility to have a near-real-time replay of a pre-empted communication while ensuring that the pre-empting communication is not interrupted. The object of the invention is achieved by a method, an apparatus, and a computer program product which are characterized by what is stated in the independent claims. The preferred embodiments of the invention are disclosed in the dependent claims.

BRIEF DESCRIPTION OF THE DRAWINGS

In the following, exemplary embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any wideband, broadband and narrowband access based network or system configured to support prioritizing and pre-emption of communications and for any user apparatus or network apparatus configured to operate at least in one of the networks/systems. Such a network/system may be based on a wireless communication system or a communication system utilizing both fixed networks and wireless networks. Examples of such access networks/systems include Terrestrial Trunked Radio Access (TETRA), TETRAPOL, DMR (digital mobile radio) systems, a PAMR network (Public Access Mobile Radio), and a 3rd or $4^{th}$, or beyond, generation mobile network, like LTE (Long Term Evolution), WiMAX (Worldwide Interoperability for Microwave Access), WLAN (Wireless Local Area Network), such as WiFi, GoTa (Global Open Trunking Architecture) and systems providing delivery of voice communications and/or multimedia sessions over Internet Protocol (IP) networks, such as the Internet.

Figure 1:
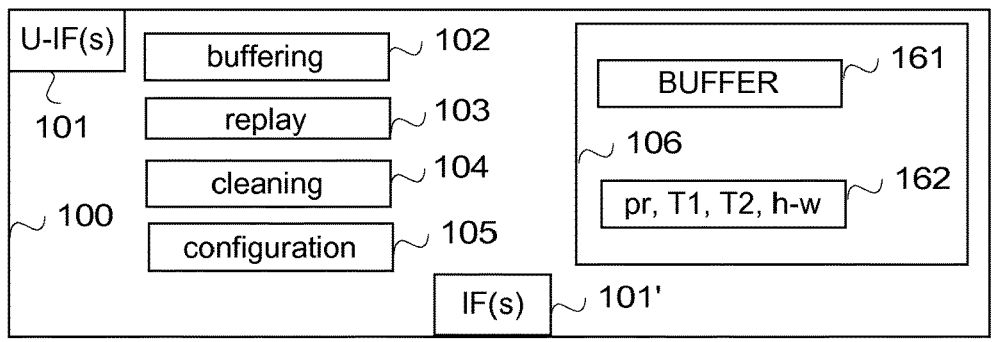
FIGS. 1 and 2 shows block diagrams of apparatuses according to exemplary embodiments.

FIG. 1 illustrates an embodiment in which an end user apparatus (device) 100 is configured to receive multiple communications simultaneously and perform the handling of different concurrent communications. The end user apparatus 100 refers to a computing device (equipment). Such computing devices (apparatuses) include wireless mobile communication devices operating with or without a subscriber identification module in hardware or in software, including, but not limited to, the following types of devices: mobile phone, smart-phone, personal digital assistant (PDA), handset, laptop and/or touch screen computer, e-reading device, tablet, game console, notebook, multimedia device, a handheld radio terminal, a so called fixed radio apparatus in a vehicle, and a dispatching workstation that may communicate over a fixed connection and/or wirelessly.

In the illustrated example the end user apparatus 100 comprises one or more user interfaces (U-IFs) 101 for outputting communications and other data and/or for receiving different user inputs, one or more different connection interfaces (IFs) 101' for providing communication connections to other end user apparatuses and/or to a network either wirelessly or over a fixed connection. The end user apparatus further comprises a buffering unit 102 for handling communications in real-time, a replay unit 103 for providing a near-real-time output of buffered pre-empted communications, a cleaning unit 104 for detecting over-aged communications in a buffer 161 and discarding them, and a configuration unit 105 for setting and configuring different parameter values 162 relating to the buffering and/or replaying. The cleaning unit 104 may be implemented by means of one or more timers.

The end user apparatus 100 further comprises one or more memories 106 for storing the different parameter values 162 and for providing the buffer 161 for storing pre-empted communications. In the illustrated example, the parameter values 162 comprise values for at least following parameters: a priority (pr), a non-activity time T1, a validity time T2 and a handling way (h-w). It should be appreciated that in other embodiments the parameter values may comprise only the non-activity time or the validity time. The priority is used to determine the importance of a communication. The priority value determines which communication(s) is/are pre-empted in case of concurrent communications exceeding the number of concurrent communications a user of the end user apparatus can follow. The non-activity time may be called a safety interval, a deactivity time or an activity time out, for example, and by means of the non-activity time it is ensured that an ongoing session/call is not interrupted. The validity time may also be called a time to be in buffer, a time-to-play time out, or a buffering time, for example, and by means of the validity time it is ensured that old items are not played to a user. The buffer is not intended for permanent storage of communications, i.e. the buffer is not an archive. The handling way may define to replay buffered communications automatically, or a request, or it may define that buffered communications are automatically replayed within a replay period, starting from a beginning or an end of a speech item, for example, if replay is possible and after the replay period the buffered communications are replayed if a request is received. The replay period is a time period for an automatic replay, and it may be static or updatable. There are no restrictions how parameter values are set/defined and/or updated/configured. A parameter value may be communication-specific, content-specific, communication- and content-specific, a group-specific, a default, or common, and it may be updated (configured) in response to a user input or to a change, like a location change of the end user apparatus 100. For example, the non-activity time T1 value may be common to all communications, the validity time T2 value may be stream-specific, for example 10 s or 10 minutes for audio and 10 days for video, the priority value may be communication-specific and/or group specific and/or stream-specific. Further, the configuration unit 105 may be configured to update/calculate values for one or more parameters. For example, the configuration unit may be configured to change the validity time in response to the user input or to calculate a new value for the non-activity time based on the load or congestion in the network or in a radio interface to the network.

An advantage provided by performing the handling in the end user apparatus is that it minimizes the load in the network, since no specific replay requests are sent in the network. Further, if the communication is transmitted in a single communication (for example as a multicast or broadcast) to all participants, no extra network resources are used for transmitting the communications although it ends up in a buffer.

Figure 2:
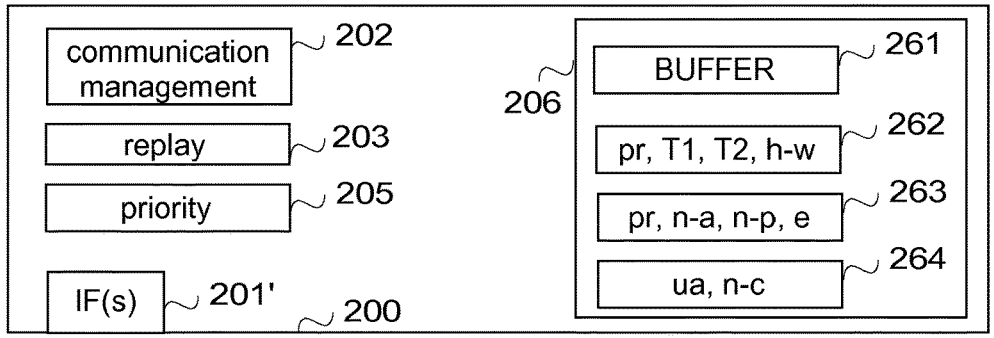

FIG. 2 illustrates an embodiment in which a network apparatus (element, node) 200 is configured to perform the handling of different concurrent communications to an end user apparatus. The network apparatus 200 refers to a computing device (equipment). Such computing devices (apparatuses) include a push-to-talk (PTT) server, a group communication server, a professional mobile radio (PMR) server, a video push-to-see server, i.e. any application server, or any multimedia server that can originate information flows towards the end user apparatuses, and even an end user apparatus configured to contain application server functionality.

In the illustrated example, the network apparatus 200 comprises one or more different connection interfaces 201' for providing communication connections to end user apparatuses and/or to other network apparatuses either wirelessly or over a fixed connection. The network apparatus further comprises a communication management unit 202 for handling communications in real-time, a replay unit 203 for providing a near-real-time output of buffered pre-empted communications and a priority unit 205 for determining priorities. A priority may have a static value, for example provided in group definitions, or a dynamic (adjustable, configurable) value that may be determined or calculated based on one or more criteria, like the number of group members, the number of active group members, network load, locations of group members, default priority value given in group definitions, etc.

In the example, the network apparatus further comprises one or more memories 206 for providing a buffer 261 for storing pre-empted communications, for storing a first list 262, a second list 263 and a third list 264. The first list 262 associates 262 priority-specifically the priority (pr) with the non-activity time T1, the validity time T2, and the handling way (h-w). In the illustrated example, if a communication is to be buffered, the "buffer parameters" are defined by the priority of the buffered communication by means of the first lists 262. In the illustrated example, the second list 263 comprises communication—specifically information on the priority (pr) of the communication, number (n-a) of active participants, and number (n-p) of pre-empted participants, and information on whether or not the communication is eligible (e) for buffering. The information on eligibility of a communication may be configured subscriber-specifically, and/or organization-specifically, and/or terminal-specifically, i.e. configured to take into account terminal capabilities. The information may be part of subscription information, for example. Further, a user or a dispatcher may be allowed to set and/or change the eligibility information, and the terminal capabilities may be preset or discovered during a registration phase. The second list may also contain information identifying a pre-empted participant and starting time and ending time of pre-emption to facilitate replaying. The third list 264 associates an end user apparatus (ua) with a preset threshold value (n-c) on how many concurrent communications stream the end user is capable to follow. The preset threshold value is configurable/updatable and may be given end user apparatus type-specifically, for example 1 communication to other end user apparatuses except 32 concurrent communications to a dispatching apparatus in an emergency centre, and/or end user apparatus—specifically, and/or depending on data delivered, for example 1 audio stream and 4 video streams.

An advantage provided by performing the handling in the network apparatus is that no configurations are needed for end user apparatuses, thus facilitating the implementation. Further, if communications are sent participant-specifically (unicast) and no replay of pre-empted communication takes place, network resources are not used in vain for transmitting information that will never be outputted.

It should be appreciated that an end user apparatus may be configured to contain one or more units and lists as the network apparatus of FIG. 2. Further, the network apparatus may be configured to contain one or more units and parameter values as the end user apparatus of FIG. 1.

Figure 3:
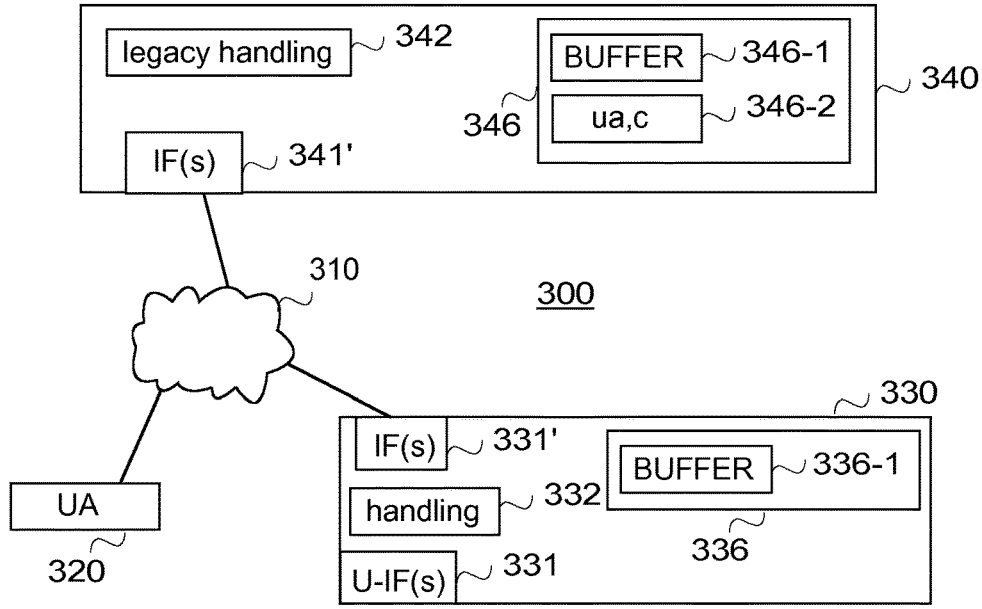
FIG. 3 shows simplified architecture of a system and block diagrams of some apparatuses according to an exemplary embodiment.

FIG. 3 illustrates a further exemplary embodiment in which there are legacy end user apparatuses not configured to perform the handling of different concurrent communications and end user apparatuses configured to perform the handling of different concurrent communications. In the exemplary embodiment of FIG. 3, a network apparatus is configured to perform the handling of different concurrent communications for the legacy end user apparatuses. FIG. 3 is a simplified system architecture only showing some apparatuses and functional entities, all being logical units whose implementation may differ from what is shown. The connections shown in FIG. 3 are logical connections; the actual physical connections may be different. It is apparent to a person skilled in the art that the systems also comprise other apparatuses, functions and structures used in or for communication. They, as well as the protocols used, are well known by persons skilled in the art and are irrelevant to the actual invention. Therefore, they need not to be discussed in more detail here.

In the example illustrated in FIG. 3, the system 300 comprises a network 310 over which end user apparatuses 320, 330 may communicate with each other.

In the example illustrated in FIG. 3, an end user apparatus 330 configured to perform the handling of different concurrent communications comprises for that purpose a handling unit 332 configured to buffer and replay automatically pre-empted communications and memory 336 for providing the buffer 336-1. In the illustrated example the values of T1 and T2 are coded to the handling unit 332. The end user apparatus 330 further comprises one or more user interfaces (U-IFs) 331 for outputting communications and other data and/or for receiving different user inputs, one or more different connection interfaces (IFs) 331' for providing communication connections to other end user apparatuses and/or to a network either wirelessly or over a fixed connection.

The network 310 comprises a network apparatus 340 having one or more interfaces (IFs) 341 to the network. The network apparatus is configured to perform the handling of different concurrent communications for legacy end user apparatuses 320 that are not configured to perform the handling of different concurrent communications. For that purpose the network apparatus 340 comprises a legacy handling unit 342 configured to buffer and replay automatically pre-empted communications to a legacy user apparatus 320, and memory 346 for providing the buffer 346-1 and for maintaining a list 346-2 associating legacy user apparatuses (ua) with pre-empted communications (c). The list 346-2 is used by the legacy handling unit 342 for automatic replay of pre-empted communications. In the illustrated example the values of T1 and T2 are coded to the legacy handling unit 342.

An advantage provided by the embodiment of FIG. 3 is that it provides backward compatibility so that users of legacy end user apparatuses receive the same service without updating their end user apparatuses.

It should be appreciated that an end user apparatus of FIG. 3 may be configured to contain one or more units and lists as the network apparatus of FIG. 2 or the one or more units and parameter values as the end user apparatus of FIG. 1 and vice versa. Further, the network apparatus may be configured to contain one or more units and parameter values as the end user apparatus of FIG. 1, or one or more units and lists as the network apparatus of FIG. 2 and vice versa.

In the examples of FIGS. 4 to 10 it is assumed, for the sake of clarity, that the communications are voice communications, like a call in which all participants can take turns to speak and listen to each other, the voice streams comprises speech items and that the user is able to listen to one voice stream at a time, without restricting different implementations of the examples to voice calls, speech items and one stream communications. It should be appreciated that same principles are usable for any data stream, or any combination of different data streams belonging to the same communication, and for any suitable format to communicate the data. Such data can represent multimedia content, audio content, video content, images, alphanumeric text, or any other data that can be communicated via a communication network. Further, a call, including a group call, means herein exchange of information between two or more parties/participants.

Figure 4:
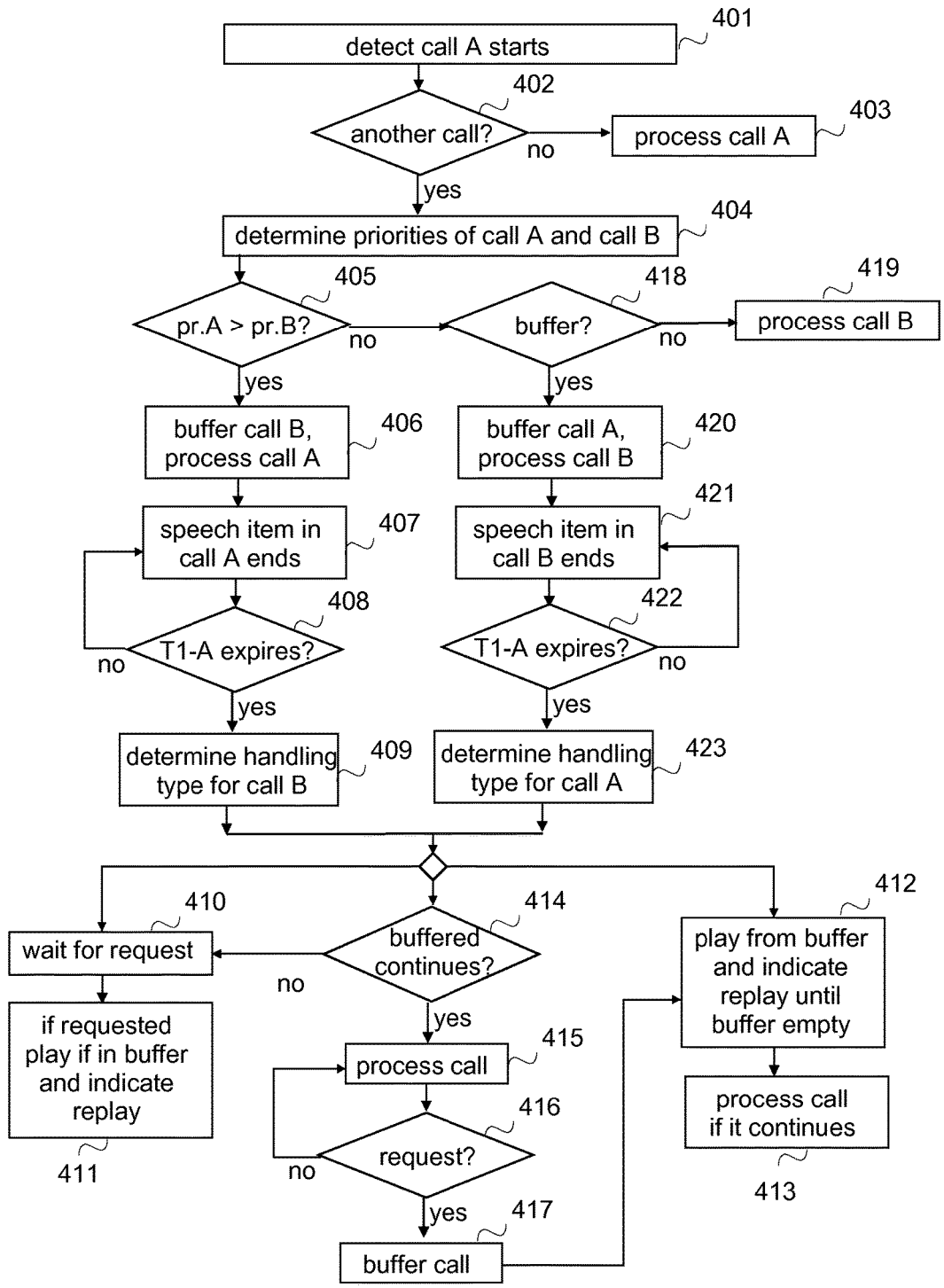
FIGS. 4 to 10 are flow charts illustrating different exemplary functionalities.

FIG. 4 is a flow chart illustrating handling of calls to which an end user apparatus participates. The functionality described may be implemented by the buffering unit/communication manage unit and the replay unit, or by the buffering unit/communication manage unit or by the legacy handling unit, for example.

In the example of FIG. 4, "call A" denotes a new call and "call B" an existing (on going) call that is not pre-empted at the time the new call A starts.

Referring to FIG. 4, when it is detected in step 401 that a new call, i.e. call A, starts, it is checked in step 402, whether or not there is another call going on, i.e. whether or not the user is a participant of one or more other calls, one of which is not pre-empted. If there is no other call (step 402), the call A is processed in step 403. With call processing is meant herein that the call is handled according to a customary way. For example, during a duplex or conference call, the user hears what the others say and the user can in turn speak or request "floor" for exclusive right to speak, and if the "floor" is granted, he/she is able to speak.

If there is another call (step 402), the call B, going on (step 402), the priorities of the call A and the priority of the call B are determined in step 404. A priority of a call is calculated based on the priority of the group and/or priority of the speaker, and or determined on the basis of an indication indicating an emergency or high priority call, for example.

Then the priorities are compared with each other in step 405. In the example it is assumed that a higher priority call is prioritized but if the priorities are the same, the earlier started call is given priority. However, in case of the priorities being the same other criteria may be used to determine which one of the calls is given priority. For example, the amount of participants of the call and/or the initiator of the call, for example a dispatcher or a member, may be used to determine which one is given the priority.

If the priority of the new call A is higher than the priority of the call B (step 405) instead of continuing processing of the call B, it is buffered in step 406 and the call A is processed in step 406. Depending on an implementation, other participants of the call B may be informed, for example by a beep or by means of a presence application, that the participant is not currently available for active communication the call. When it is detected in step 407, that a speech item in the call A ends, it is monitored in step 408 whether or not a non-activity time for the call A, T1-A, expires before a new speech item in the call A starts. If the non-activity time T1-A does not expire (step 408), the process continues to step 407. Hence, by the means of the non-activity time it is ensured that the pre-empting call is not interrupted. Further, there is no need to signal the end of the call in a direct mode operation or in PTT system, for example.

If the non-activity time T1-A expires (step a 408), a handling type for the buffered call B determined in step 409. In the illustrated example there are three different ways to handle a buffered call. There are no limitations regarding the number of different ways to handle a buffered call as long as at least one way to handle buffered calls is determined. If there are two or more different handling types, the handling type may be predefined for a group the call is for, or it may depend on the priority of the call and/or it may depend on who initiated the call, or any other criterion/criteria may be used.

If the buffered call is to be replayed only in response to receiving a specific request from the user, the request is waited for in step 410. If a request for replay of the buffered call is received, the buffered speech items are played and indicated as a replay to the user in step 411, if there still is in the buffer valid speech items for the buffered call. A valid speech item is a speech item whose validity time has not expired.

If the buffered call is to be automatically replayed from the buffer as long as there are valid speech items for the buffered call, the buffered speech items are played and indicated as a replay to the user in step 412 until there are no buffered speech items for the call in the buffer. Then the buffered call is processed in step 413 if the buffered call continues, i.e. is still going on.

If the user is to be joined to the buffered call as if the call would not have been pre-empted it is checked in step 414, whether or not the buffered call still continues. If it does not continue, in the example it is assumed that it will be replayed only on a specific request from the user, and the process proceeds to step 410. Alternatively the process may proceed to step 412 to automatically replay the buffered speech items, and/or it may be determined whether to proceed to step 410 or to step 412. If the buffered call still continues (step 414), the call is processed in step 415. While the call is processed, it is monitored in the example, whether or not a request for a replay of buffered speech items is received from the user in step 416. If such a request is received, buffering the call restarts in step 417 and the process proceeds to step 412 to play the buffered speech items.

In another example, while a call is processed (step 415), it is not possible to request for a replay.

If the priority of the new call A is not higher than the priority of the call B (step 405), it is checked in step 418, whether or not the new call is to be buffered. The decision may depend on the priority of the new call A, or the handling type of the buffered speech items, for example. Regardless whether or not the call is buffered, the other participants of the new call may be informed that the participant is not currently available for active communication in the call A. If the new call is not to be buffered, processing of the call B is continued in step 419.

If the new call A is to be buffered (step 418), processing of the call B is continued in step 420 and the call A is buffered in step 420. When it is detected in step 421, that a speech item in the call B ends, it is monitored in step 422 whether or not a non-activity time for the call B, T1-B, expires before a new speech item in the call B starts. The non-activity time T1-B may be different from or the same as the non-activity time T1-A. If the non-activity time T1-B does not expire (step 422), the process continues to step 421.

If the non-activity time T1-B expires (step a 422), a handling type for the buffered call A determined in step 423, as is described above with step 409. Then the process continues as described above, depending on the handling type.

It is obvious for one skilled in the art that if the user is able to follow more than one call at a time, in step 402 it is checked, whether or not the amount of ongoing calls, including the new call, exceeds the amount of calls the user is able to follow at a time, and process proceeds to step 404 only if there are more calls than what the user is able to follow.

In another embodiment, step 418 and steps 420-423 are not implemented (i.e. they are skipped over), and a new call is never buffered.

Figure 5:
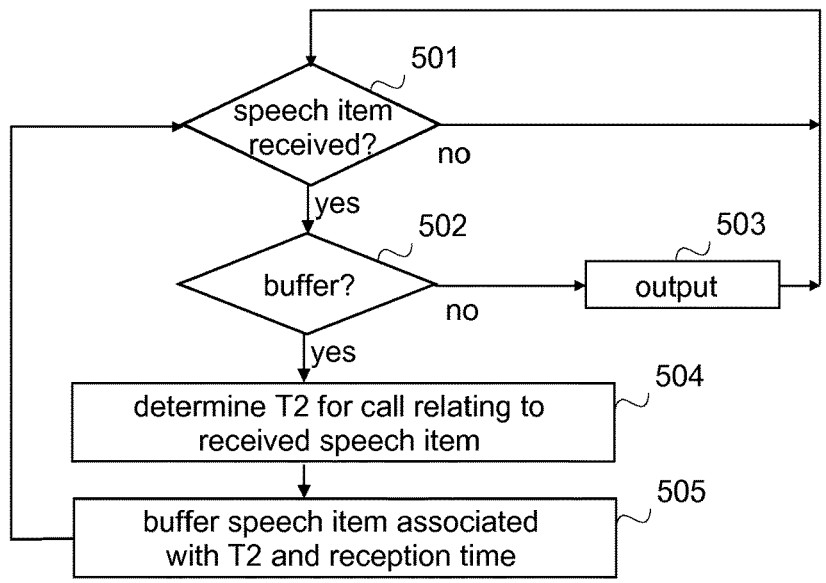

FIG. 5 illustrates an exemplary functionality on how to handle received speech items. The buffering unit, and/or the communication management unit, and/or the legacy handling unit and/or the handling unit may be configured to perform corresponding functionality.

Referring to FIG. 5, when a speech item is received in step 501, it is checked in step 502 whether or not the call the speech item relates to is to be buffered. If not, the speech item is outputted in step 503, and the process continues to step 501.

If the speech item relates to a call that is to be buffered (step 502), i.e. the call is pre-empted, a validity time T2 for the call is determined in step 504. There are no limitations to the validity time. The validity time T2 may depend on the priority value of the call, or it may be given in group definitions of a group the call relates to, or a user may set the validity time. Then in the illustrated example the process puts in step 505 the speech item into the buffer and associates it with T2 and a reception time of the speech item, and continues to step 501. Alternatively, the speech item containing sending time may be associated with T2 either directly or via call information containing T2. In still a further alternative, a last time to play the speech item may be calculated from the reception time or sending time and T2, and the last time to play is then associated with the speech item in the buffer.

Figure 6:
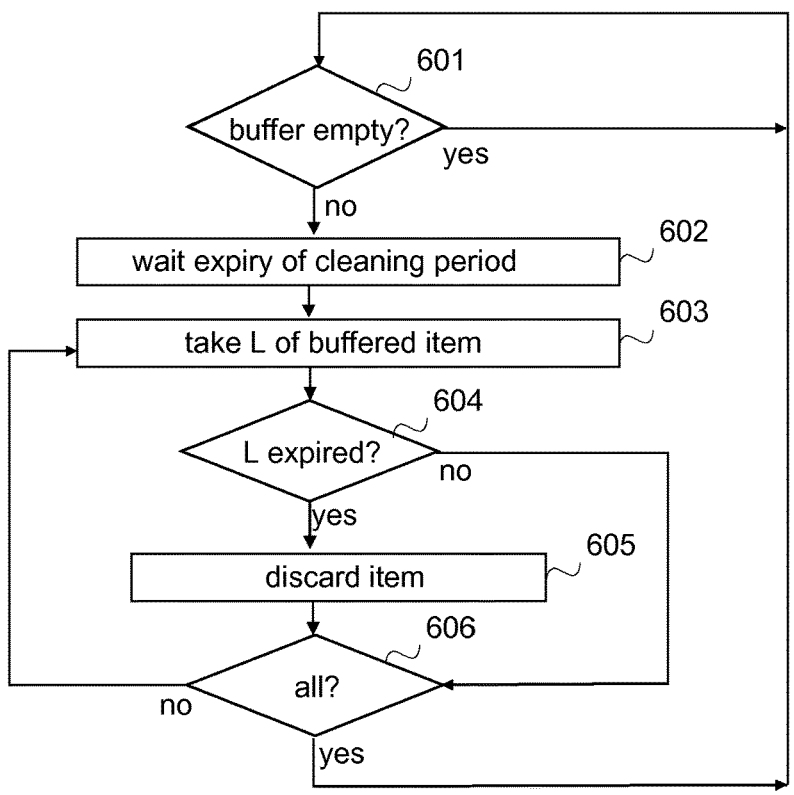

FIG. 6 illustrates an embodiment, in which the apparatus is configured to clean the buffer. More precisely, it illustrates an exemplary functionality of a cleaning unit. It should be appreciated that the communication management unit, and/or the legacy handling unit and/or the handling unit may be configured to perform corresponding functionality.

Referring to FIG. 6, it is monitored in step 601, whether or not the buffer is empty. When it is detected that the buffer is not empty, the process waits in step 602 until a cleaning period expires. The cleaning period may be any time period. The cleaning period may be set to correspond to the shortest validity time when a speech item is buffered, or it may be a preset value, for example. Then a last time to play (L) of a buffered speech item is taken in step 603 and it is checked in step 604 whether or not the last time to play has expired. If it is expired, the speech item is discarded (deleted) from the buffer in step 605, and then it is checked in step 606, whether or not all speech items in the buffer are processed. If not, the process continues to step 603 to take a last time to play of a next buffered speech item.

If all speech items in the buffer are processed (step 606), the process proceeds to step 601 to check whether or not the buffer is empty.

If the last time to play has not expired (step 604), the process proceeds to step 606 to check whether or not all speech items in the buffer are processed.

Figure 7:
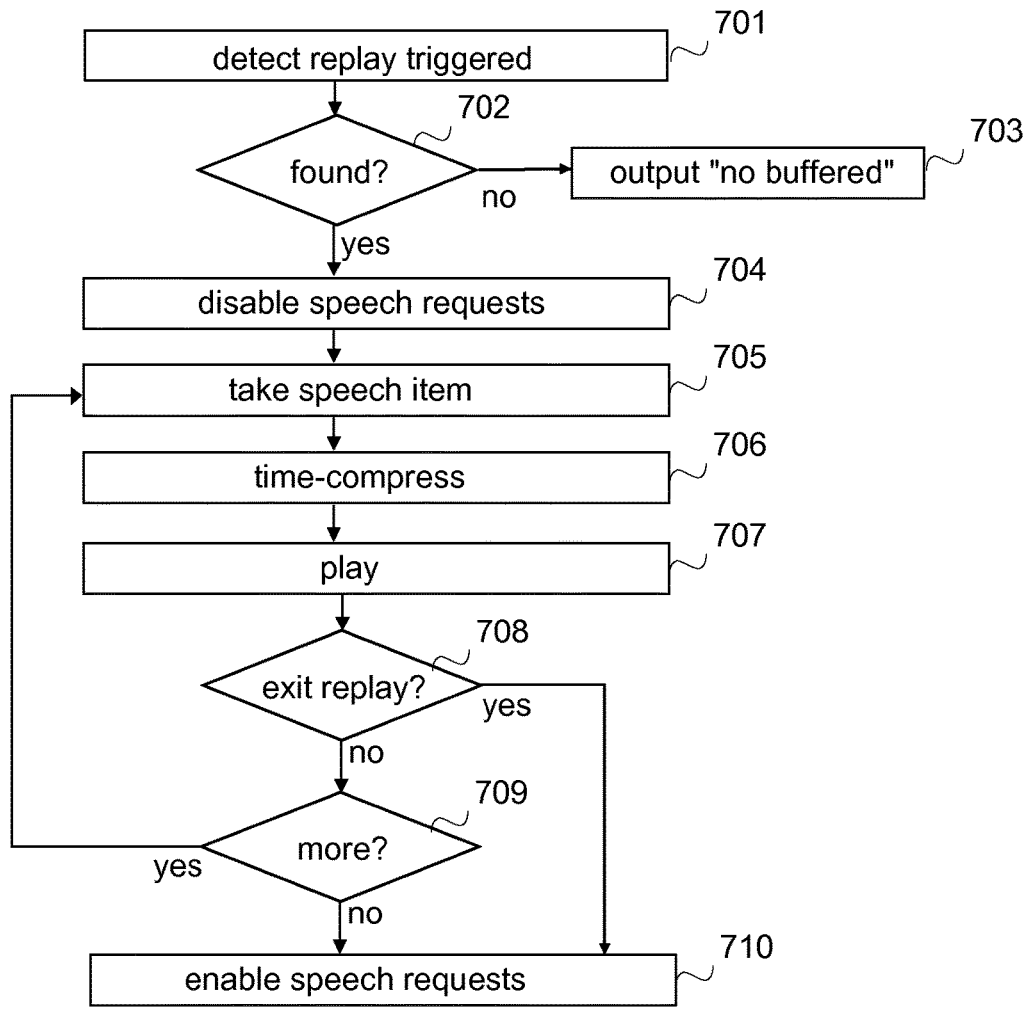

FIG. 7 illustrates an exemplary replay procedure. In the illustrated example it is assumed that the cleaning operation described with FIG. 6 is implemented. A further assumption made with FIG. 7 is that the replay is triggered by the user specifically requesting a replay of the call.

Referring to FIG. 7, when a replay of a buffered call is triggered in step 701, it is checked in step 702, whether or not any speech items relating to the buffered call can be found from the buffer. If the buffered speech items are not any more valid, i.e. the cleaning process has discarded them from the buffer, in the illustrated example information that there are no buffered speech items or that the replay is not possible is outputted in step 703. Any other information or no information may be outputted in step 703.

If at least one buffered speech item is found (step 702), the replay starts by disabling in step 704 speech requests from a user. The disabling may be implemented in several ways. For example, if the user is actively attached to the group whose speech items are replayed, speech requests are ignored, or the button or corresponding means for requesting a permission to talk may be disabled so that they are not responsive to the user input as long as the user has not indicated to exit (step 708) the replay mode. If the user is not actively attached to the group whose speech items are replayed, the disabling is an inherent feature: the user is able to talk only in the active group. An advantage of the disabling is that the other users/participants in the call are not confused on a comment to information they have heard long ago. Then a speech item is taken in step 705 from the buffer and the speech item is time-compressed in step 706. Any suitable time-compression method may be used. An advantage of time compression is that the buffered speech may be played in a shorter time than the original speech item but it still remains understandable. Another advantage is that the user detects that the played item is a replay. Then the time-compressed speech item is played in step 707. While doing the replay it is monitored in step 708 whether an implicit or explicit exit is received as a user input. An explicit exit is a use of an exit button (or icon on a touch screen). An implicit exit is that a user selects a new group to which he/she is going to be actively attached. Another implicit exit is that the user presses the button for requesting a permission to talk and the replayed call is not from an "actively attached to" group. When the time-compressed speech item is played and no exit is detected (step 708), it is checked in step 709, whether or not the buffer contains more speech items relating to the call. If it does, the process continues to step 705 to take the next speech item from the buffer. If there are no more speech items of the buffered call in the buffer (709), the replay ends and the speech requests from the user are enabled again in step 710.

If the exit is detected (step 708), the replay ends and speech requests from the user are enabled again in step 710.

Figure 8:
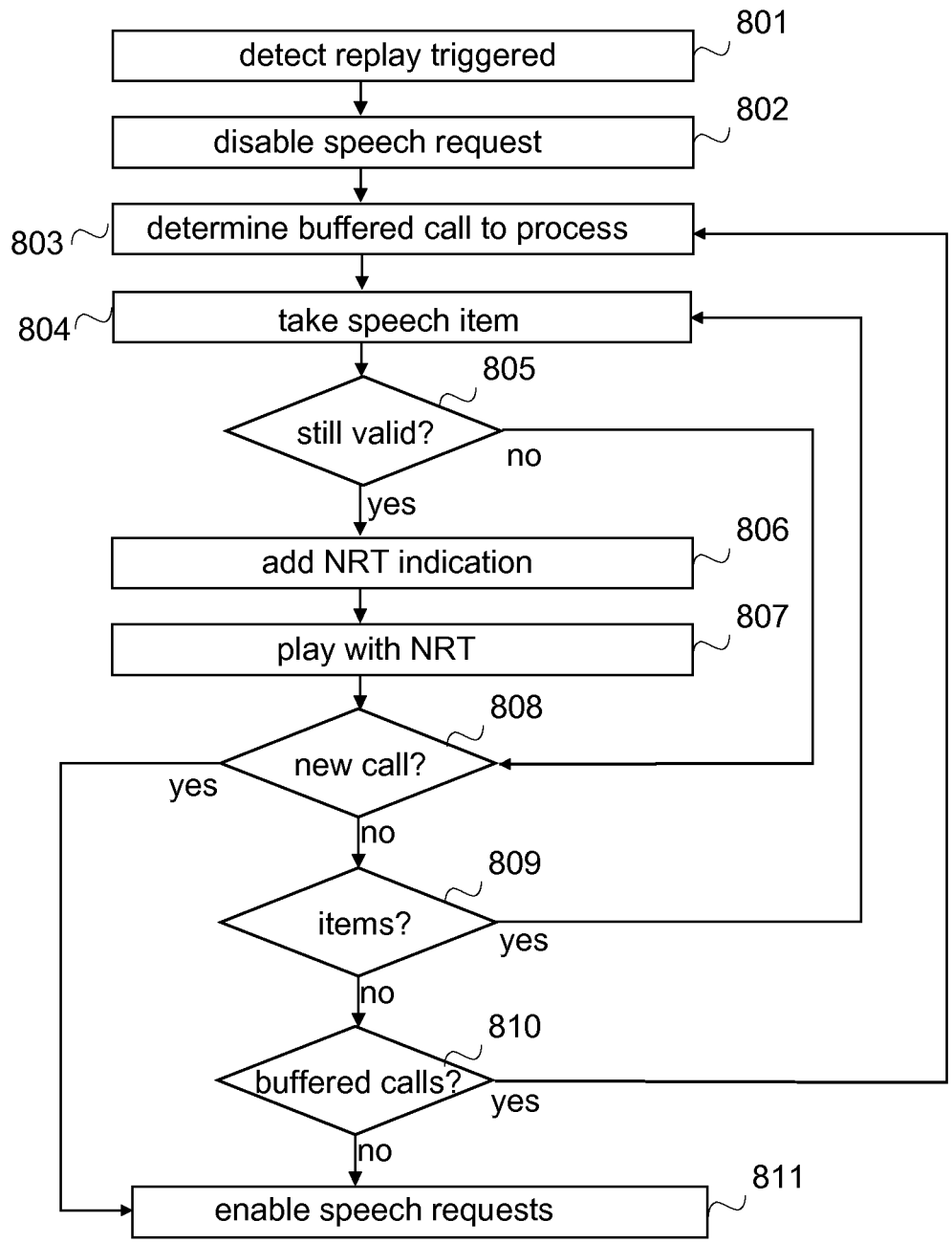

FIG. 8 illustrates another exemplary replay procedure. In the example of FIG. 8 it is assumed that all buffered calls are replayed unless pre-empted by a new real-time call. In other words, the buffered calls are assumed to have a lower priority than any real-time call regardless of the original priority of a buffered call. Further, in the illustrated example no buffer cleaning process is implemented.

Referring to FIG. 8, when a replay is triggered in step 801, speech requests from a user are disabled in step 802 and it is determined in step 803 which buffered call is taken to be processed. The buffer may be emptied by using "first buffered call is first replayed" principles, and/or taking the buffered call with the shortest validity time T2 first and/or replaying the buffered calls according to their priority, starting from the highest priority, for example. It should be appreciated that any suitable criterion (criteria) may be used to determine the order the buffer is emptied.

After determining the call to be replayed, a speech item of the buffered call is taken in step 804, and it is checked in step 805, whether or not the speech item is still valid. In other words, it is checked whether or not the last time to play of the speech item has expired. If the speech item is still valid (step 805), a non-real-time (NRT) indication is added to and/or combined with the speech item in step 806. The non-real-time indication may be an audible indication, like beeps, or one or more visual indications, like a flash or an icon, or a combination of audible and visual indications, and NRT indication may be outputted/played before the speech item is played and/or repeated while the speech item is played and/or played once during the time the speech item is played. Then the speech item is played in step 807 with the non-real-time indication.

Meanwhile it is monitored (step 808), whether or not a new real-time call has started. If not, it is checked in step 809, whether there still are speech items of the buffered call in the buffer. If there is, the process continues to step 804 to take a speech item. If there is no speech items (step 809), it is checked in step 810, whether or not there still is at least one buffered call. If there is, the process continues to step 803 to determine a buffered call to be replayed next. If there is no buffered calls (step 810), i.e. the buffer is empty, the replay ends and the speech request are enabled in step 811.

If the speech item is not valid (step 805), it is monitored in step 808, whether a new real-time call has started.

If a new real-time call has started (step 808), the process quits the replaying and enables in step 811 the speech requests for the user.

In another implementation the non-real-time indication may be played only with a first speech item of a buffered call.

Figure 9:
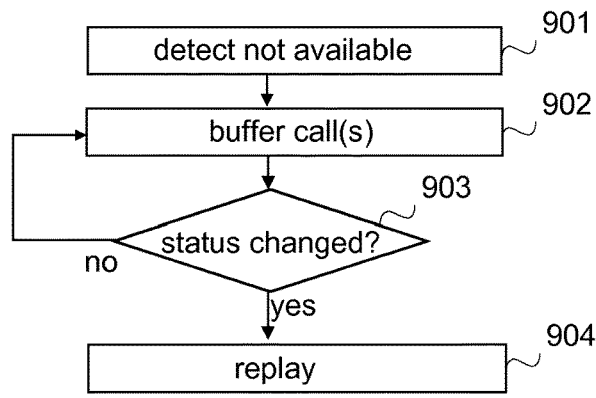

FIG. 9 illustrates an exemplary functionality in which a call is interpreted to be as a pre-empted call, when the user is not able to participate to the call. This may be detected, for example, in response to the user's presence information indicating "not available", or in response to the user providing a corresponding input.

Referring to FIG. 9, when the fact that the user is not able to participate to a call, i.e. the user is not available for the call, is detected in step 901, the call is buffered in step 902 as if it were pre-empted. In other words, the buffering is performed using the above described principles. Buffering of the call (calls) is continued as long as the status of the user does not change (step 903). When the user becomes again available, i.e. the status changes (step 903), the buffered call or calls are replayed in step 904 either automatically or on request, depending on the settings, for example. The replaying may be performed as described above.

Figure 10:
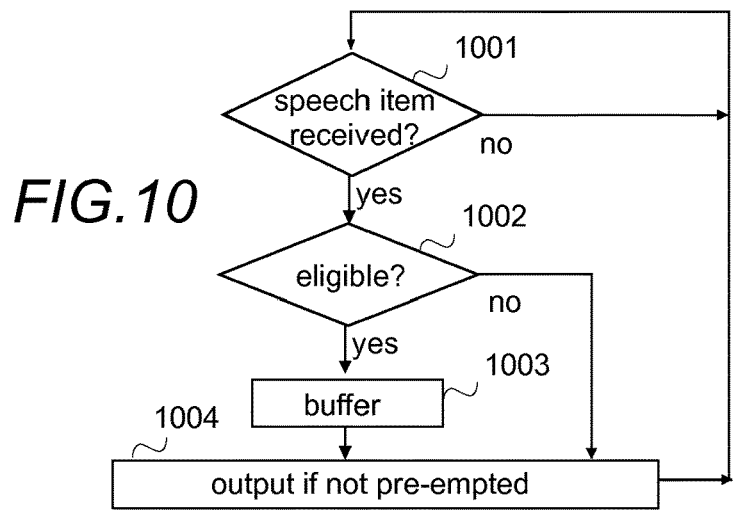

FIG. 10 illustrates an exemplary functionality in which each call eligible for buffering, is buffered so that it is playable, if requested, a certain time interval regardless whether or not it was pre-empted.

Referring to FIG. 10, when a speech item is received in step 1001, it is checked in step 1002, whether or not the call or a stream the speech item relates to is indicated as eligible. If the speech item is indicated as eligible, the speech item is buffered in step 1003 and then outputted in step 1004 unless it is pre-empted. If the speech item is not indicated as eligible (step 1002), the speech item is outputted in step 1004 unless it is pre-empted.

Figure 11:
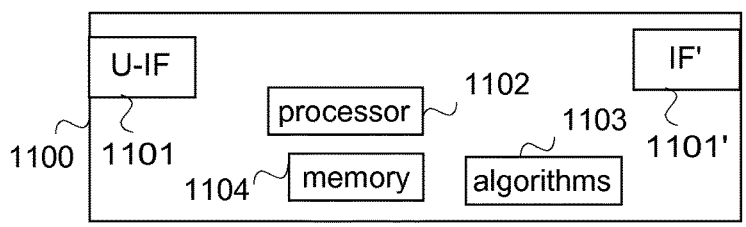
FIGS. 11 and 12 are block diagrams of exemplary apparatuses.

FIG. 11 is a simplified block diagram illustrating some units for an apparatus 1100 configured to be an end user apparatus handling concurrent communications, i.e. an apparatus providing at least one of the units described above and/or one or more units configured to implement at least some of the functionalities described above. In the illustrated example the apparatus comprises one or more interfaces (IF) 1101' for receiving and transmitting communications, one or more user interfaces (U-IF) 1101 for interaction with a user, a processor 1102 configured to implement at least some functionality described above with a corresponding algorithm/algorithms 1103 and a memory 1104 usable for storing a program code required at least for the implemented functionality and the algorithms and for the buffer and other information.

Figure 12:
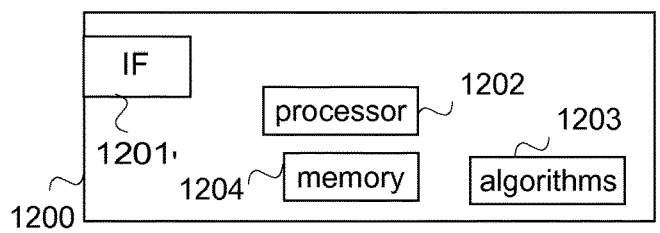

FIG. 12 is a simplified block diagram illustrating some units for an apparatus 1200 configured to be a network apparatus handling concurrent communications, i.e. an apparatus providing at least one of the units described above and/or one or more units configured to implement at least some of the functionalities described above. In the illustrated example, the apparatus comprises one or more interfaces (IF) 1201' for receiving and transmitting information, a processor 1202 configured to implement at least some functionality described above with a corresponding algorithm/algorithms 1203, and memory 1204 usable for storing a program code required at least for the implemented functionality and the algorithms and for the buffer and other information.

In other words, an apparatus configured to provide the end user apparatus, and/or an apparatus configured to provide the network apparatus, or an apparatus configured to provide one or more corresponding functionalities, is a computing device that may be any apparatus or device or equipment configured to perform one or more of corresponding apparatus functionalities described with an embodiment/example/implementation, and it may be configured to perform functionalities from different embodiments/examples/implementations. The unit(s) described with an apparatus may be separate units, even located in another physical apparatus, the distributed physical apparatuses forming one logical apparatus providing the functionality, or integrated to another unit in the same apparatus.

The techniques described herein may be implemented by various means so that an apparatus implementing one or more functions of a corresponding apparatus described with an embodiment/example/implementation comprises not only prior art means, but also means for implementing the one or more functions of a corresponding apparatus described with an embodiment and it may comprise separate means for each separate function, or means may be configured to perform two or more functions. For example, the units, and/or algorithms, and/or calculation mechanisms may be software and/or software-hardware and/or hardware and/or firmware components (recorded indelibly on a medium such as read-only-memory or embodied in hard-wired computer circuitry) or combinations thereof. Software codes may be stored in any suitable, processor/computer-readable data storage medium(s) or memory unit(s) or article(s) of manufacture and executed by one or more processors/computers, hardware (one or more apparatuses), firmware (one or more apparatuses), software (one or more modules), or combinations thereof. For a firmware or software, implementation can be through modules (e.g., procedures, functions, and so on) that perform the functions described herein. Software codes may be stored in any suitable, processor/computer-readable data storage medium(s) or memory unit(s) or article(s) of manufacture and executed by one or more processors/computers.

An apparatus configured to provide the end user apparatus, and/or an apparatus configured to provide the network apparatus, and/or an apparatus configured to provide one or more corresponding functionalities, may generally include a processor, controller, control unit, micro-controller, or the like connected to a memory and to various interfaces of the apparatus. Generally the processor is a central processing unit, but the processor may be an additional operation processor. Each or some or one of the units and/or algorithms and/or calculation mechanisms described herein may be configured as a computer or a processor, or a microprocessor, such as a single-chip computer element, or as a chipset, including at least a memory for providing storage area used for arithmetic operation and an operation processor for executing the arithmetic operation. Each or some or one of the units and/or algorithms and/or calculation mechanisms described above may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed in such a way to carry out one or more functions or calculations of one or more embodiments. In other words, each or some or one of the units and/or the algorithms and/or the calculation mechanisms described above may be an element that comprises one or more arithmetic logic units, a number of special registers and control circuits.

Further, an apparatus implementing functionality or some functionality according to an embodiment/example/implementation of an apparatus configured to provide the end user apparatus, and/or an apparatus configured to provide the network apparatus, or an apparatus configured to provide one or more corresponding functionalities, may generally include volatile and/or non-volatile memory, for example EEPROM, ROM, PROM, RAM, DRAM, SRAM, double floating-gate field effect transistor, firmware, programmable logic, etc. and typically store content, data, or the like. The memory or memories may be of any type (different from each other), have any possible storage structure and, if required, being managed by any database management system. The memory may also store computer program code such as software applications (for example, for one or more of the units/algorithms/calculation mechanisms) or operating systems, information, data, content, or the like for the processor to perform steps associated with operation of the apparatus in accordance with examples/embodiments. The memory, or part of it, may be, for example, random access memory, a hard drive, or other fixed data memory or storage device implemented within the processor/apparatus or external to the processor/apparatus in which case it can be communicatively coupled to the processor/network node via various means as is known in the art. An example of an external memory includes a removable memory detachably connected to the apparatus.

An apparatus implementing functionality or some functionality according to an embodiment/example/implementation of an apparatus configured to provide the end user apparatus, and/or an apparatus configured to provide the network apparatus, or an apparatus configured to provide one or more corresponding functionalities, may generally comprise different interface units, such as one or more receiving units for receiving user data, control information, requests and responses, for example, and one or more sending units for sending user data, control information, responses and requests, for example. The receiving unit and the transmitting unit each provides an interface in an apparatus, the interface including a transmitter and/or a receiver or any other means for receiving and/or transmitting information, and performing necessary functions so that content and other user data, control information, etc. can be received and/or transmitted. The receiving and sending units may comprise a set of antennas, the number of which is not limited to any particular number.

Further, an apparatus implementing functionality or some functionality according to an embodiment/example/implementation of an apparatus configured to provide the end user apparatus, and/or an apparatus configured to provide the network apparatus, or an apparatus configured to provide one or more corresponding functionalities, may comprise other units.

It should be appreciated that the different ways described above relating to buffering, replaying, determining or updating parameter values or time limits/periods, and the parameters used may be combined differently than what is disclosed above. For example, an implementation may be that there is a static safety interval, and when a pre-empting communication is determined to have ended because the safety interval expired, the pre-empted communications are played from the buffer.

Although in the above examples relating to automatic replaying, the buffer is emptied communication-specifically that need not be the case, the buffer may be emptied speech-item by speech-item regardless of the communication they relate to.

The steps and related functions described above in FIGS. 4 to 10 are in no absolute chronological order, and some of the steps may be performed simultaneously or in an order differing from the given one. For example, while a speech item is played in step 706 another speech item may be time-compressed in step 705, and the monitoring of a new call (step 808) is performed simultaneously with all other steps in FIG. 8. Other functions can also be executed between the steps or within the steps. For example, before replaying it may be checked, whether a user of an end user apparatus requesting replay is authorized to have or has access rights to the buffered communications. Another example is that a speech item may be time-compressed and provided with a non-real-time indication. Some of the steps or part of the steps can also be left out or replaced by a corresponding step or part of the step. For example, when an item is discarded from a buffer it may be forwarded to an archive.

As is evident from the above, different examples and embodiments provide the user a possibility to obtain the advantages provided by pre-emption without having the disadvantages of prior art pre-emption. For example, the user has a possibility to catch up the missed conversations.

It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
    detecting that a pre-empting communication is pre-empting a pre-empted communication, wherein the pre-empting communication and the pre-empted communication are different concurrent communications both having the same end user apparatus as one of parties;
    processing the pre-empting communication for a user of said end user apparatus so that the user is an active participant of the pre-empting communication who is available for active exchange of information with other participants of the pre-empting communication;
    buffering, in response to the detecting, instead of processing, the pre-empted communication to a buffer for a replay for the user so that the user is not an active participant of the pre-empted communication and is not available for active exchange of information with other participants of the pre-empted communication;
    determining a safety interval for the pre-empting communication, the safety interval determining a non-activity time for the pre-empting communication;
    starting monitoring of an expiry of the safety interval after detecting an end of a data stream in the pre-empting communication; and
    stopping the monitoring of the expiry of the safety interval in response to detecting a start of a new data stream in the pre-empting communication; and
    determining that the pre-empting communication has ended in response to the expiry of the safety interval, stop processing the pre-empting communication, and when the pre-empted communication is still continuing with the other participants of the pre-empted communication, starting processing said pre-empted communication for the user so that the user is an active participant of said pre-empted communication.

2. The method of claim 1, further comprising
    determining a validity time for the pre-empted communication;
    associating during buffering the pre-empted communication with the validity time; and
    allowing replay of the pre-empted communication from the buffer if the validity time is not expired.

3. The method of claim 1, further comprising:
    triggering the replay of the pre-empted communication from the buffer in response to receiving a request for the replay.

4. The method of claim 1, further comprising:
    triggering the replay of the pre-empted communication from the buffer in response to the determining that the pre-empting communication has ended.

5. The method of claim 4, further comprising
    determining a replay order of buffered pre-empted communications based on at least one of starting time of pre-emption, remaining validity time, and priority of the pre-empted communication; and
    replaying the pre-empted communications according to the determined replay order.

6. The method of claim 4, further comprising
    checking, in response to the pre-empting communication ending, whether or not a replay period for an automatic replay has expired, and triggering automatic replay of the pre-empted communication from the buffer only if the replay period for the automatic replay has not expired.

7. The method of claim 6, further comprising:
    after the replay period for the automatic replay has expired, triggering the replay of the pre-empted communication from the buffer in response to receiving a request for the replay.

8. The method of claim 2, further comprising discarding a communication whose validity time has expired from the buffer.

9. The method of claim 1, further comprising checking before buffering, whether or not the communication to be buffered is eligible for buffering, and performing the buffering only in response to the communication being eligible for buffering.

10. The method of claim 1, further comprising:
    detecting that a user is not able to participate to a communication; and
    performing the buffering as if the communication were a pre-empted communication.

11. The method of claim 2, wherein the replayed communication is played with a near-real-time indication.

12. The method of claim 2, wherein the replayed communication is time-compressed before it is played.

13. The method of claim 2, further comprising allowing a use of a user apparatus only for replaying while a buffered communication is replayed in the user apparatus.

14. The method of claim 1, further comprising performing the pre-empting in response to the amount of concurrent communications exceeding a preset threshold value.

15. An apparatus, which is one of an end user apparatus configured to handle different concurrent communications having said end user apparatus as one of parties and a network apparatus configured to handle, for the end user apparatus, said concurrent communications, the apparatus comprising at least one processor and at least one memory including computer program code, the at least one memory and the computer program code configured to, with the at least one processor, cause the apparatus to at least:
- detect that a pre-empting communication is pre-empting a pre-empted communication, wherein the pre-empting communication and the pre-empted communication are said different concurrent communications both having as one party said end user apparatus;
- process the pre-empting communication for a user of said end user apparatus so that the user is an active participant who is available for active exchange of information with other participants of the pre-empting communication;
- buffer, in response to detecting, instead of processing, the pre-empted communication to a buffer for a replay for the user so that the user is not an active participant and is not available for active exchange of information with other participants of the pre-empted communication;
- determine a safety interval for the pre-empting communication, wherein the safety interval determines a non-activity time for the pre-empting communication;
- start monitoring of an expiry of the safety interval after detecting an end of a data stream in the pre-empting communication;
- stop the monitoring of the expiry of the safety interval in response to detecting a start of a new data stream in the pre-empting communication; and
- determine that the pre-empting communication has ended in response to the expiry of the safety interval, stop processing the pre-empting communication and, when the preempted communication is still continuing with the other participants of the pre-empted communication, start processing said pre-empted communication for the user so that the user is an active participant of said pre-empted communication.

16. The apparatus of claim 15, wherein the at least one memory and the computer program code are further configured to, with the at least one processor, cause the apparatus to:
- determine a validity time for the pre-empted communication;
- associate during buffering the pre-empted communication with the validity time; and
- allow replay of the pre-empted communication from the buffer if the validity time is not expired.

17. The apparatus of claim 15, wherein the at least one memory and the computer program code are further configured to, with the at least one processor, cause the apparatus to:
- trigger the replay of the pre-empted communication from the buffer in response to one of receiving a request for the replay and determining that the pre-empting communication has ended.

18. The apparatus of claim 15, wherein the at least one memory and the computer program code are further configured to, with the at least one processor, cause the apparatus to:
- check before buffering, whether or not the communication to be buffered is eligible for buffering; and
- buffer only communication that is eligible for buffering.

19. A non-transitory computer readable media having stored thereon instructions that, when executed by a computing device, cause the computing device to:
- detect that a pre-empting communication is pre-empting a pre-empted communication, wherein the pre-empting communication and the pre-empted communication are different concurrent communications both having as one party the same end user apparatus;
- process the pre-empting communication for a user of said end user apparatus so that the user is an active participant who is available for active exchange of information with other participants of the pre-empting communication;
- buffer, in response to detecting, instead of processing, the pre-empted communication to a buffer for a replay for the user so that the user is not an active participant and is not available for active exchange of information with other participants of the pre-empted communication;
- determine a safety interval for the pre-empting communication, wherein the safety interval determines a non-activity time for the pre-empting communication;
- start monitoring of an expiry of the safety interval after detecting an end of a data stream in the pre-empting communication;
- stop the monitoring of the expiry of the safety interval in response to detecting a start of a new data stream in the pre-empting communication; and
- determine that the pre-empting communication has ended in response to the expiry of the safety interval, stop processing the pre-empting communication and, when the pre-empted communication is still continuing with the other participants of the pre-empted communication, start processing said pre-empted communication for the user so that the user is an active participant of said pre-empted communication.

20. The non-transitory computer readable media of claim 19 having stored thereon further instructions that, when executed by a computing device, cause the computing device further to:
- determine a validity time for the pre-empted communication;
- associate during buffering the pre-empted communication with the validity time; and
- allow replay of the pre-empted communication from the buffer if the validity time is not expired.

* * * * *